(12) United States Patent
Kagitani

(10) Patent No.: US 9,184,996 B2
(45) Date of Patent: Nov. 10, 2015

(54) THIN CLIENT SYSTEM, MANAGEMENT SERVER, CLIENT ENVIRONMENT MANAGEMENT METHOD AND PROGRAM

(75) Inventor: Toshiya Kagitani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 536 days.

(21) Appl. No.: 13/232,621

(22) Filed: Sep. 14, 2011

(65) Prior Publication Data

US 2012/0072599 A1 Mar. 22, 2012

(30) Foreign Application Priority Data

Sep. 21, 2010 (JP) ................................ 2010-210817

(51) Int. Cl.
*G06F 15/173* (2006.01)
*H04L 12/24* (2006.01)

(52) U.S. Cl.
CPC .................................. *H04L 41/0853* (2013.01)

(58) Field of Classification Search
CPC .................................................. H04L 41/0853
USPC ........................................................ 709/226
See application file for complete search history.

(56) References Cited

U.S. PATENT DOCUMENTS

| | | | |
|---|---|---|---|
| 6,950,990 B2 * | 9/2005 | Rajarajan et al. | 715/736 |
| 7,085,805 B1 * | 8/2006 | Ruberg et al. | 709/203 |
| 7,424,543 B2 * | 9/2008 | Rice, III | 709/229 |
| 7,840,594 B2 * | 11/2010 | Teodoro et al. | 707/781 |
| 2006/0182092 A1 * | 8/2006 | Kodaka | 370/352 |
| 2006/0294181 A1 * | 12/2006 | Barzacanos et al. | 709/203 |
| 2007/0008973 A1 * | 1/2007 | Galea | 370/392 |
| 2007/0079252 A1 * | 4/2007 | Ramnani | 715/781 |
| 2007/0180450 A1 * | 8/2007 | Croft et al. | 718/1 |
| 2007/0268824 A1 * | 11/2007 | Kodaka et al. | 370/229 |
| 2007/0294414 A1 * | 12/2007 | Koshiba | 709/227 |

(Continued)

FOREIGN PATENT DOCUMENTS

| JP | 2002-7270 A | | 1/2002 |
|---|---|---|---|
| JP | 2004021672 A | * | 1/2004 |

(Continued)

OTHER PUBLICATIONS

Japanese Office Action for JP Application No. 2010-210817 mailed on Apr. 22, 2014 with partial English Translation.

*Primary Examiner* — Kostas Katsikis

(57) ABSTRACT

The thin client system is capable of automatically providing an appropriate client environment according to the performance of each terminal. The thin client system includes at least one terminal, a client environment server where a client environment used by the terminal operates, and a management server which allocates the predetermined client environment based on a utilization request of the client environment from the terminal, wherein the management server comprises a client environment management unit which receives from the terminal, terminal identification information for identifying the terminal, and terminal part information for identifying a terminal part which is a component of the terminal, and uses a client environment component that is set in advance so as to correspond to the terminal part information to generate the client environment in the client environment server.

8 Claims, 14 Drawing Sheets

(56) References Cited

U.S. PATENT DOCUMENTS

| | | |
|---|---|---|
| 2008/0183841 A1* | 7/2008 | Isokawa et al. .............. 709/217 |
| 2008/0263217 A1* | 10/2008 | Kimizuka et al. ............ 709/229 |
| 2008/0319952 A1* | 12/2008 | Carpenter et al. ................ 707/3 |
| 2009/0100129 A1* | 4/2009 | Vigil et al. .................... 709/203 |
| 2009/0276524 A1* | 11/2009 | Ohtani ......................... 709/224 |
| 2010/0205297 A1* | 8/2010 | Sarathy ........................ 709/224 |
| 2011/0010420 A1* | 1/2011 | Kagitani ....................... 709/203 |
| 2011/0230268 A1* | 9/2011 | Williams ........................ 463/42 |
| 2012/0036254 A1* | 2/2012 | Onuma ......................... 709/224 |

FOREIGN PATENT DOCUMENTS

| | | | |
|---|---|---|---|
| JP | 2007179108 A | | 7/2007 |
| JP | 2007334686 A | | 12/2007 |
| JP | 2008-140306 A | | 6/2008 |
| JP | 2008-287614 A | | 11/2008 |
| JP | 2010-61432 A | | 3/2010 |
| JP | 2010-182260 A | | 8/2010 |
| JP | 2010182260 A | * | 8/2010 |
| JP | 5517463 B2 | * | 6/2014 |

* cited by examiner

FIG. 1  THIN CLIENT SYSTEM 100

THIN CLIENT SYSTEM, MANAGEMENT SERVER, CLIENT ENVIRONMENT MANAGEMENT METHOD AND PROGRAM

INCORPORATION BY REFERENCE

This application is based upon and claims the benefit of priority from Japanese patent application No. 2010-210817, filed on Sep. 21, 2010, the disclosure of which is incorporated herein in its entirety by reference.

TECHNICAL FIELD

The present invention relates to a thin client system in which a client environment is used from a remote terminal, and more particularly, to a thin client system, a management server, a client environment management method and a program capable of automatically providing an appropriate client environment according to the performance of each terminal.

BACKGROUND ART

Recently, attention is focused on a thin client system in which client environments are aggregated on a server from the viewpoint of security. Some thin client systems use a session management technique in which a client environment, a user that uses the client environment and a terminal used by the user are associated with one another and a server collectively sets and manages information indicating which user can use which client environment from which terminal.

An example of such a thin client system is described in Patent Literature 1, for example.

However, with the technique described in Patent Literature 1, there is a problem that since a client environment that is to be connected must be set for each terminal, the labor of an administrator increases.

More specifically, with the technique described in Patent Literature 1, there is a problem that since the following three steps must be carried out: (1) a client environment used by a user is generated, (2) information on a terminal is registered and (3) the generated client environment is associated with the registered terminal information, it takes much time to carry out the setting.

In order to solve the problems, the computer system (thin client system) disclosed in Patent Literature 2 is proposed as the related art.

In the related art described in Patent Literature 2, a terminal transmits its own structure information to a server, and the server stores the structure information and determines an operating environment based on the structure information, thus a user does not have to set different runtime environments for each terminal by oneself, thereby allowing the usability to be greatly improved.

Patent Literature 1: Japanese Patent Laying-Open No. 2007-334686

Patent Literature 2: Japanese Patent Laying-Open No. 2007-179108

However, with the technique described in Patent Literature 2, there is a problem that since the operating environment is changed by changing a launch application, elements constituting the client environment such as a CPU (Central Processing Unit) and a memory cannot be set.

EXEMPLARY OBJECT OF THE PRESENT INVENTION

An exemplary object of the present invention is to solve the foregoing problems, and provide a thin client system, a management server, a client environment management method and a program capable of automatically providing an appropriate client environment according to the performance of each terminal.

SUMMARY

According to a first exemplary aspect of the invention, a thin client system, includes at least one terminal, a client environment server where a client environment used by the terminal operates, and a management server which allocates the predetermined client environment based on a utilization request of the client environment from the terminal, wherein the management server comprises a client environment management unit which receives from the terminal, terminal identification information for identifying the terminal, and terminal part information for identifying a terminal part which is a component of the terminal, and uses a client environment component that is set in advance so as to correspond to the terminal part information to generate the client environment in the client environment server.

According to a second exemplary aspect of the invention, a management server of a thin client system which comprises at least one terminal; a client environment server where a client environment used by the terminal operates; and a management server which allocates the predetermined client environment based on a utilization request of the client environment from the terminal, includes a client environment management unit which receives from the terminal, terminal identification information for identifying the terminal, and terminal part information for identifying a terminal part which is a component of the terminal, and uses a client environment component that is set in advance so as to correspond to the terminal part information to generate the client environment in the client environment server.

According to a third exemplary aspect of the invention, a client environment management method of a thin client system which comprises at least one terminal; a client environment server where a client environment used by the terminal operates; and a management server which allocates the predetermined client environment based on a utilization request of the client environment from the terminal, wherein the management server receives from the terminal, terminal identification information for identifying the terminal, and terminal part information for identifying a terminal part which is a component of the terminal, and uses a client environment component that is set in advance so as to correspond to the terminal part information to generate the client environment in the client environment server.

According to a fourth exemplary aspect of the invention, a computer readable medium storing a program executed on management server of a thin client system which comprises at least one terminal; a client environment server where a client environment used by the terminal operates; and the management server which allocates the predetermined client environment based on a utilization request of the client environment from the terminal, wherein the program causes the management server to execute processing of receiving from the terminal, terminal identification information for identifying the terminal, and terminal part information for identifying a terminal part which is a component of the terminal, and using a client environment component that is set in advance so as to correspond to the terminal part information to generate the client environment in the client environment server.

According to the present invention, it is possible to automatically provide an appropriate client environment according to the performance of each terminal.

EXEMPLARY EMBODIMENT

First Exemplary Embodiment

A first exemplary embodiment of the present invention will be described in detail with reference to the drawings. In the following drawings, the structure of portions that are not related to the substance of the present invention is omitted and not shown.

Figure 1:
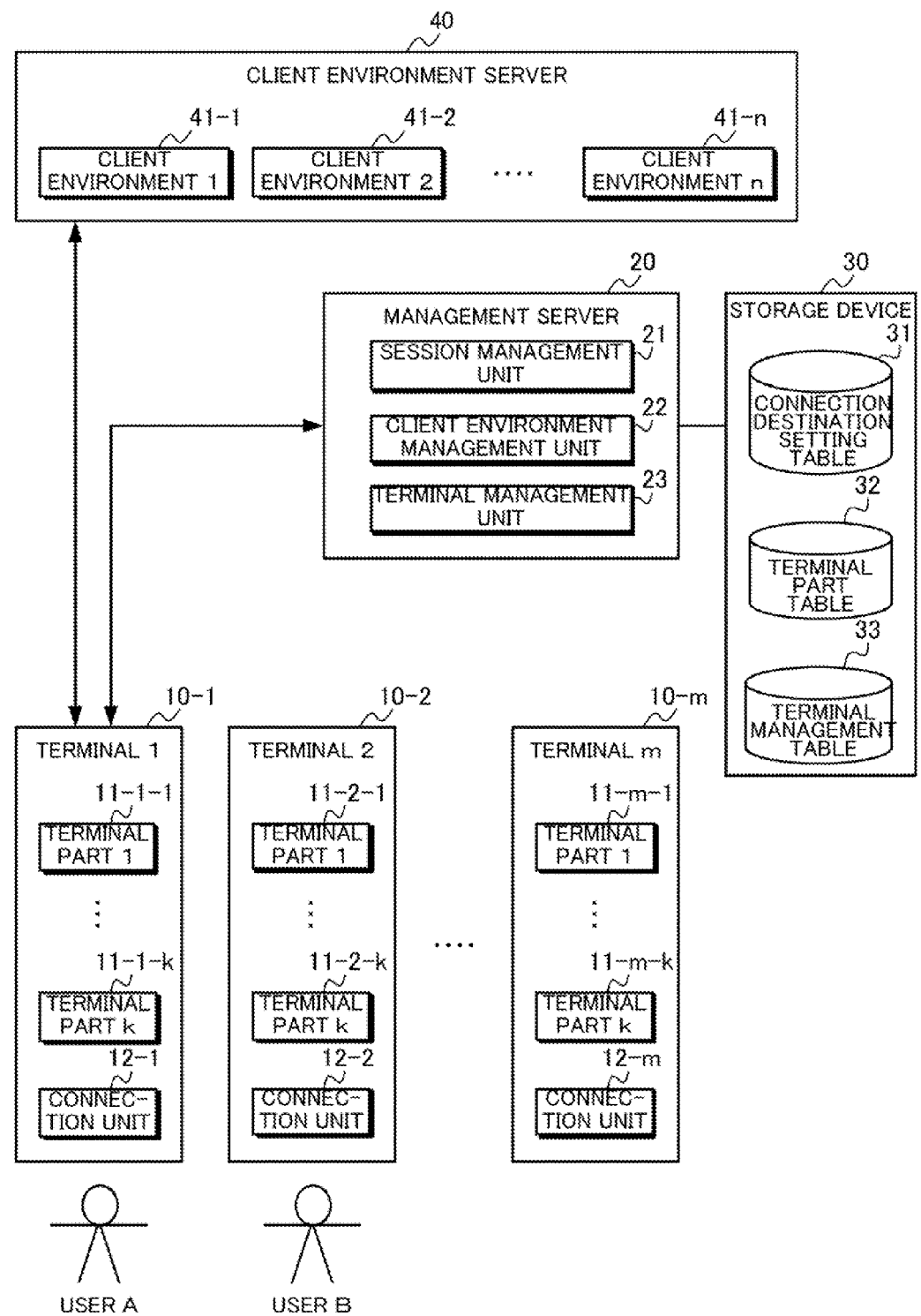
FIG. 1 is a block diagram showing the structure of a thin client system according to a first exemplary embodiment of the present invention.

FIG. 1 is a block diagram showing the structure of a thin client system 100 according to the present exemplary embodiment.

Referring to FIG. 1, the thin client system 100 according to the present exemplary embodiment comprises at least one terminal 10-$m$, a management server 20 which allocates a client environment to a user, generates a client environment and manages a terminal, a storage device 30 which retains information used by the management server 20, and a client environment server 40 where at least one client environment 41-$n$ operates.

Here, n (any natural number larger than or equal to one) represents the number of client environments, and m (any natural number larger than or equal to one) represents the number of terminals.

The terminal 10-$m$ comprises at least one terminal part 11-$m$-$k$. A terminal part 101 may be constituted by a plurality of physical terminal parts or may be a collection of logical data.

Here, k (any natural number larger than or equal to one) represents the number of terminal parts. However, respective terminals do not have to have the same number of terminal parts.

Moreover, the terminal 10-$m$ includes a connection unit 12-$m$ which establishes connection to the management server 20 and the client environment 41-$n$.

When establishing the connection to the management server 20, the connection unit 12-$m$ transmits terminal identification information and terminal part information of its own terminal to the management server.

The terminal identification information is information for identifying the terminal 10-$m$. The terminal identification information may be any information associated with the terminal 10-$m$. According to the present exemplary embodiment, the terminal identification information includes, without being limited thereto, an IP address, a MAC address, a terminal name and a terminal 1D.

The terminal part information is information on the terminal part 11-$m$-$k$ which the terminal 10-$m$ has. According to the present exemplary embodiment, the part name of the terminal part 11-$m$-$k$ is the terminal part information, without being limited thereto.

The terminal part information is incorporated into each of the terminal part 11-$m$-$k$ in advance, without being limited thereto.

The management server 20 includes a session management unit 21, a client environment management unit 22 and a terminal management unit 23.

When receiving a connection request from the terminal 10-$m$ to the client environment 41-$n$, following the connection request, the session management unit 21 makes a reference to a connection destination setting table 31 and allocates the appropriate client environment 41-$n$ to the terminal 10-$m$.

In addition, the session management unit 21 stores in the connection destination setting table the association between the terminal 10-$m$ and the client environment 41-$n$ in a given case.

The client environment management unit 22 makes a reference to a terminal part table 32 and a terminal management table 33, and, if required, generates or removes the client environment 41-$n$ and information associated therewith.

The client environment management unit 22 uses the terminal part information of the terminal 10-$m$ to make a reference to a terminal part table 32, and acquires the client environment component corresponding to the terminal part information of the terminal 10-$m$.

Further, the client environment management unit 22 generates in the client environment server 40 a client environment 41-$n$ according to the acquired client environment component.

Moreover, when an administrator removes the information of the terminal 10-$m$ from the terminal management table 33, the client environment management unit 22 removes the client environment 41-$n$ associated with the terminal 10-$m$ from the client environment server 40, and removes the association between the terminal 10-*m* and the client environment 41-*n* from the connection destination setting table 31.

Note that the client environment management unit 22 does not necessarily have to forcibly remove the client environment 41-*n*. For example, in the case that after a terminal 10-1 is removed, it is desired to cause another terminal 10-2 to use the client environment 41-*n* that was used by the terminal 10-1, the client environment 41-1 may not be removed.

The terminal management unit 23 stores in the terminal management table 33 the terminal identification information of the terminal 10-*m* in a given case.

A storage device 30 comprises the connection destination setting table 31, the terminal part table 32 and the terminal management table 33.

Figure 2:
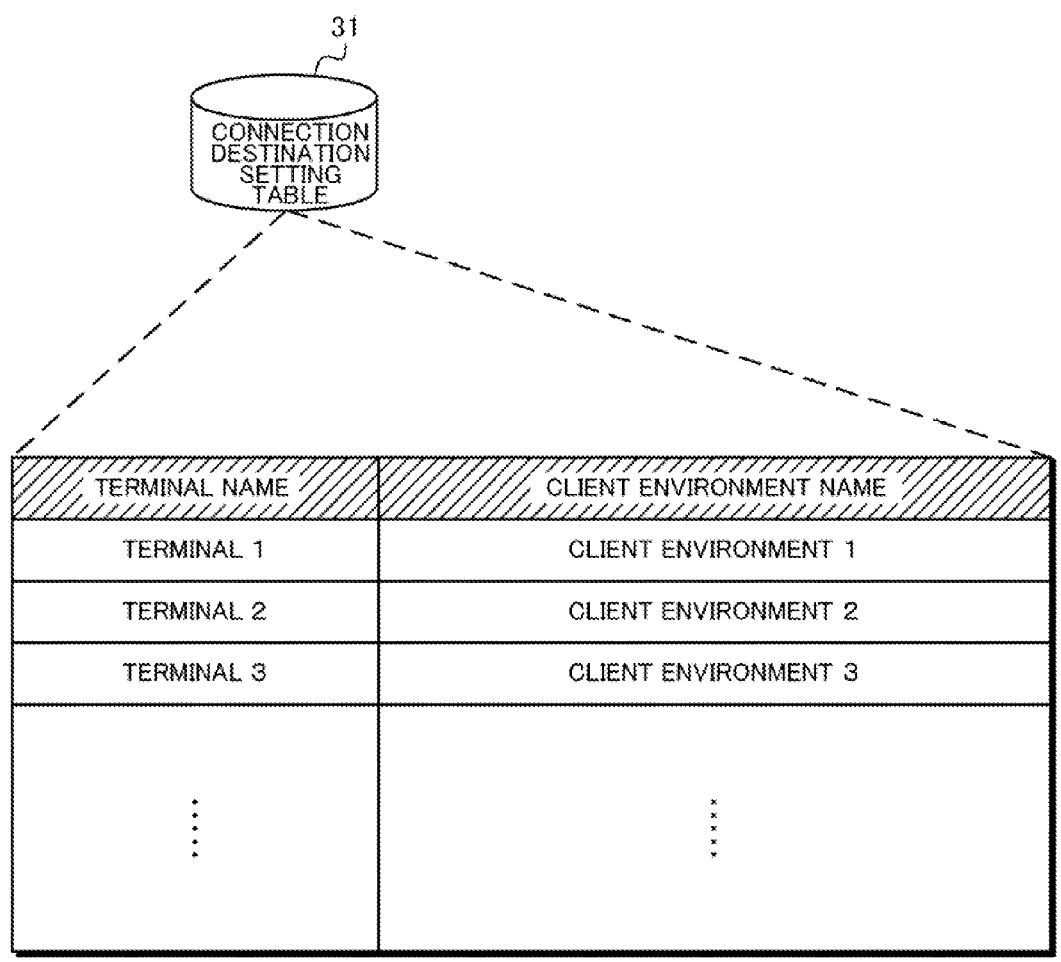
FIG. 2 is a diagram showing an example of the structure of a connection destination setting table according to the first exemplary embodiment.

The connection destination setting table 31 stores the association between the terminal 10-*m* and the client environment 41-*n*. An example of the structure of the connection destination setting table 31 is shown in FIG. 2. The information stored in the connection destination setting table 31 is used when the session management unit 21 allocates the client environment 41-*n* to the terminal 10-*m*.

The terminal part table 32 stores the association between the terminal part 11-*m*-*k* and the client environment component. An example of the structure of the terminal part table 32 is shown in FIG. 3.

Note that the connection destination setting table 31, terminal part table 32 and the terminal management table 33 may be included in the management server 20.

Figure 3:
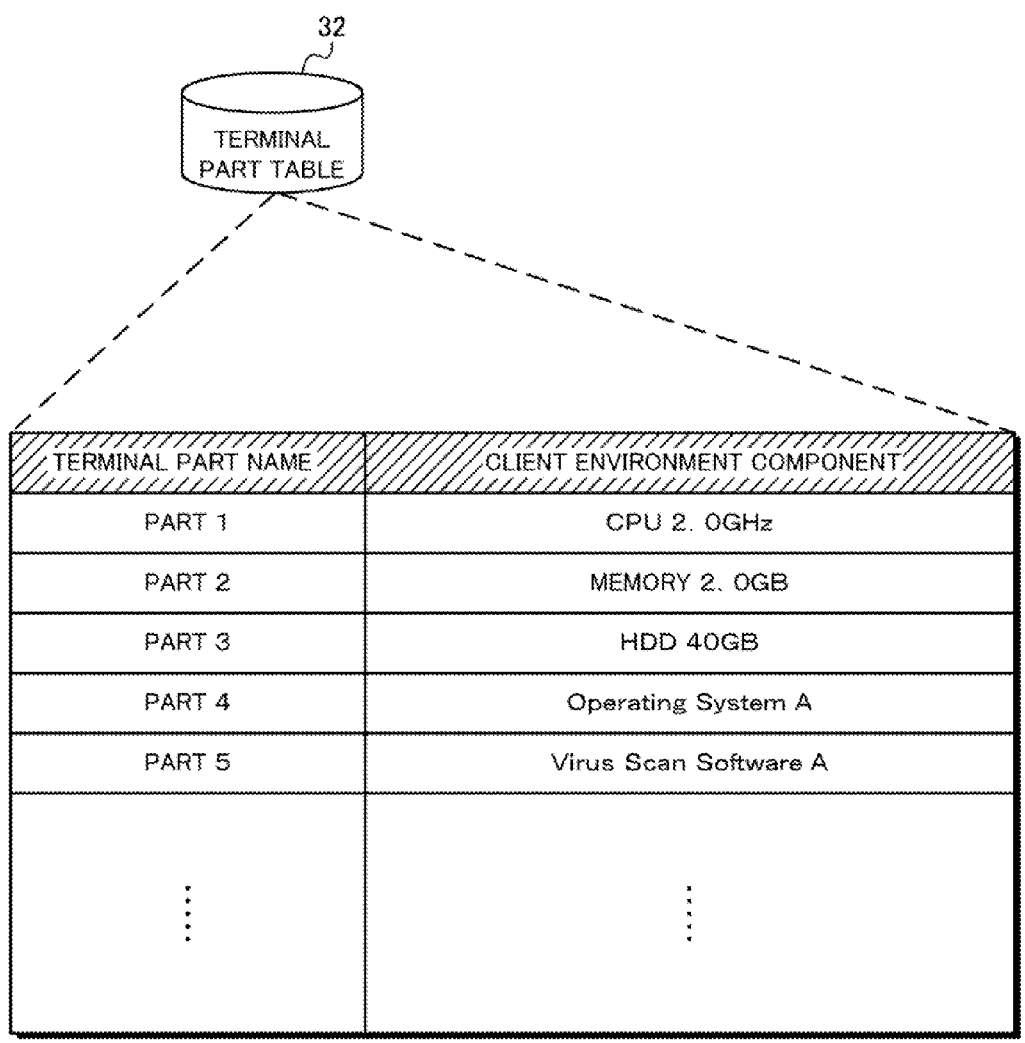
FIG. 3 is a diagram showing an example of the structure of a terminal part table according to the first exemplary embodiment.

The client environment component represents information indicating the component of the client environment 41-*n* that is to be generated (as shown in FIG. 3, the component may include not only a hardware element such as a CPU, a memory and an HDD, but also a software element such as an operating system and an application).

Such information is used when the client environment management unit 22 generates a client environment 41-*n*.

Figure 4:
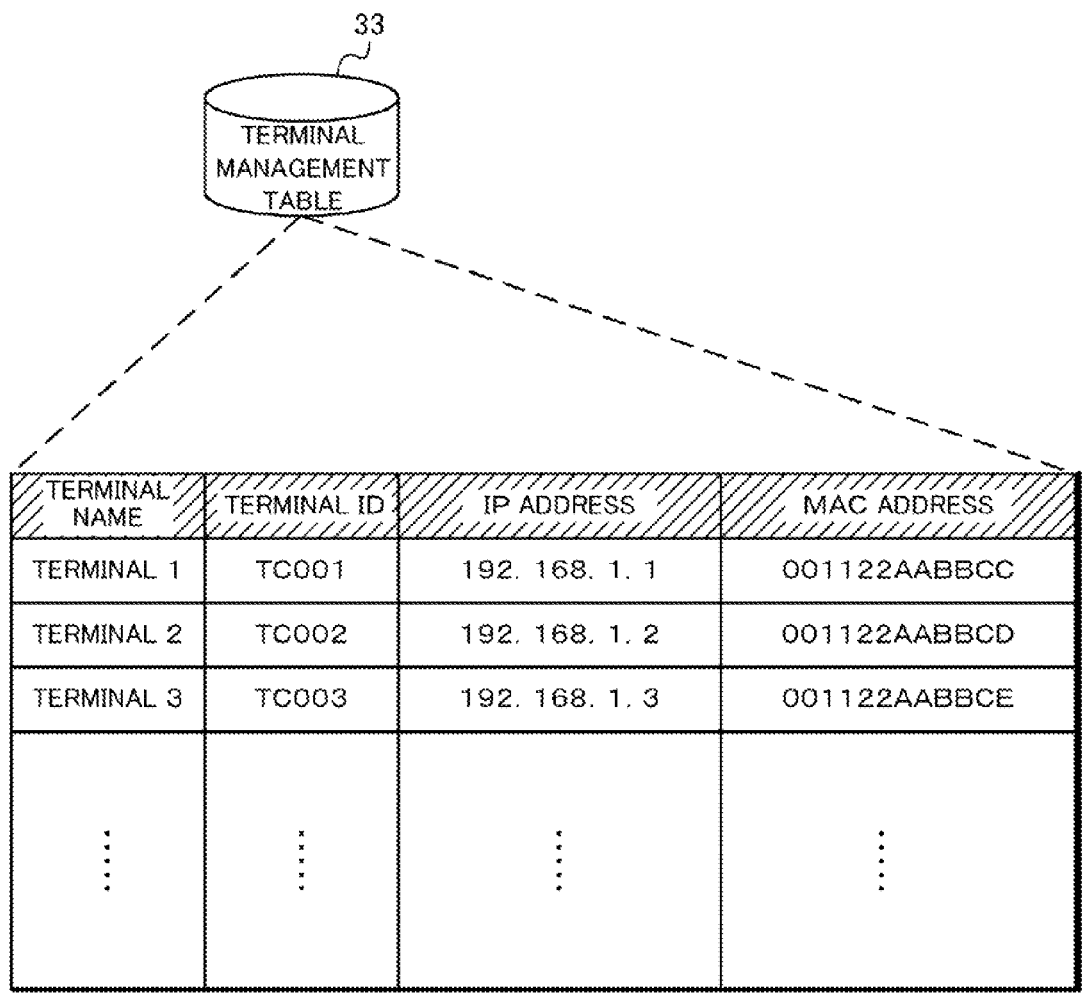
FIG. 4 is a diagram showing an example of the structure of a terminal management table according to the first exemplary embodiment.

The terminal management table 33 stores the terminal identification information of the terminal 10-*m*. An example of the structure of the terminal management table 33 is shown in FIG. 4. FIG. 4 shows only one instance, and any information associated with the terminal 10-*m* may be stored.

The client environment server 40 operates at least one client environment 41-*n*. The client environment 41-*n* includes an OS (operating system), an application and the like.

Description of Operation of the First Exemplary Embodiment

Next, the operation of the thin client system 100 according to the present exemplary embodiment will be described with reference to the flow chart in FIG. 5.

Figure 5:
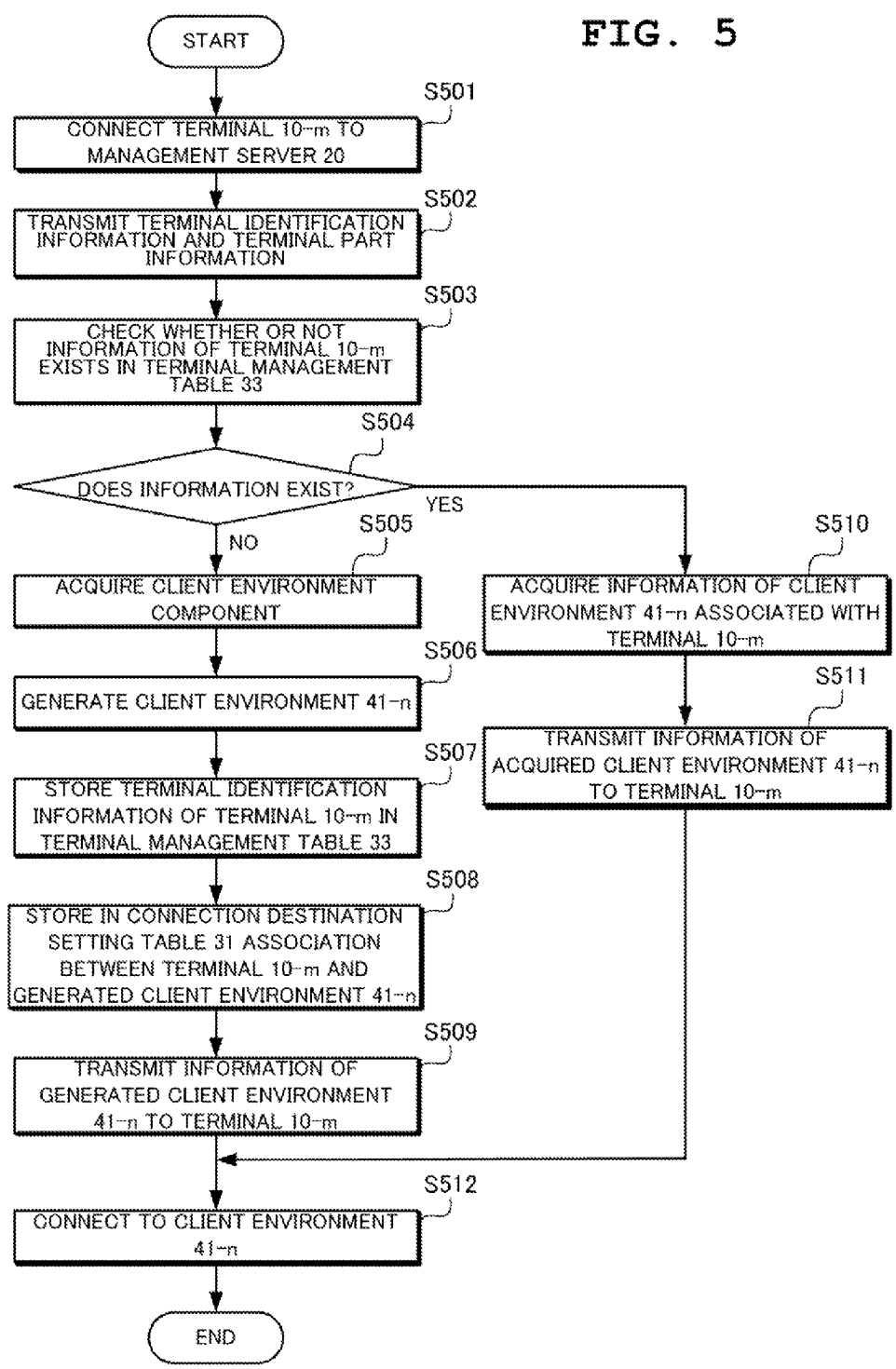
FIG. 5 is a flow chart showing an operation of the thin client system according to the first exemplary embodiment.

Referring to FIG. 5, by operation of the user, first, the connection unit 12-*m* of the terminal 10-*m* is connected to the management server 20 (step S501). At that time, the connection unit 12-*m* transmits the terminal identification information and terminal part information of the terminal 10-*m* to the management server 20 (step S502).

Then, the session management unit 21 of the management server 20 uses the terminal identification information of the terminal 10-*m* to make a reference to the terminal management table 33, and checks whether or not the information of the terminal 10-*m* exists in the terminal management table 33 (step S503).

If the information of the terminal 10-*m* does not exist in the terminal management table 33 (step S504, "No"), then the client environment management unit 22 uses the terminal part information of the terminal 10-*m* to make a reference to the terminal part table 32, and acquires the client environment component corresponding to the terminal part information of the terminal 10-*m* (step S505).

Then, the client environment management unit 22 generates in the client environment server 40 a client environment 41-*n* according to the acquired client component (step S506).

After the client environment 41-*n* is generated, the terminal management unit 23 stores the terminal identification information of the terminal 10-*m* in the terminal management table 33 (step S507).

In addition, the session management unit 21 stores in the connection destination setting table 31 the association between the terminal 10-*m* and the generated client environment 41-*n* (step S508).

Then, the session management unit 21 transmits the information of the generated client environment 41-*n* to the terminal 10-*m* (step S509).

If the information of the terminal 10-*m* exists in the terminal management table 33 (step S504, "Yes"), the session management unit 21 uses the terminal identification information of the terminal 10-*m* to make a reference to the connection destination setting table 31, and acquires the information of the client environment 41-*n* associated with the terminal 10-*m* (step S510).

Then, the session management unit 21 transmits the information of the acquired client environment 41-*n* to the terminal 10-*m* (step S511).

When the terminal 10-*m* receives the information of the client environment 41-*n* in the connection destination from the management server 20, the connection unit 12 is connected to the client environment 41-*n* based on the information (step S512).

First Example

Next, the operation of the thin client system 100 according to the present exemplary embodiment will be described with reference to a concrete example.

(Description of Structure)

In the present example, the thin client system 100 has the same structure as that of FIG. 1.

The terminal part table 32 is set by the administrator in advance as shown in FIG. 3. Although the table structures of the connection destination setting table 31 and the terminal management table 33 are the same as those of FIGS. 2 and 4, the tables contain no data and are empty in the initial condition.

In addition, there is no client environment 41-*n* in the client environment server 40 in the initial condition.

(Description of Operation)

Figure 6:
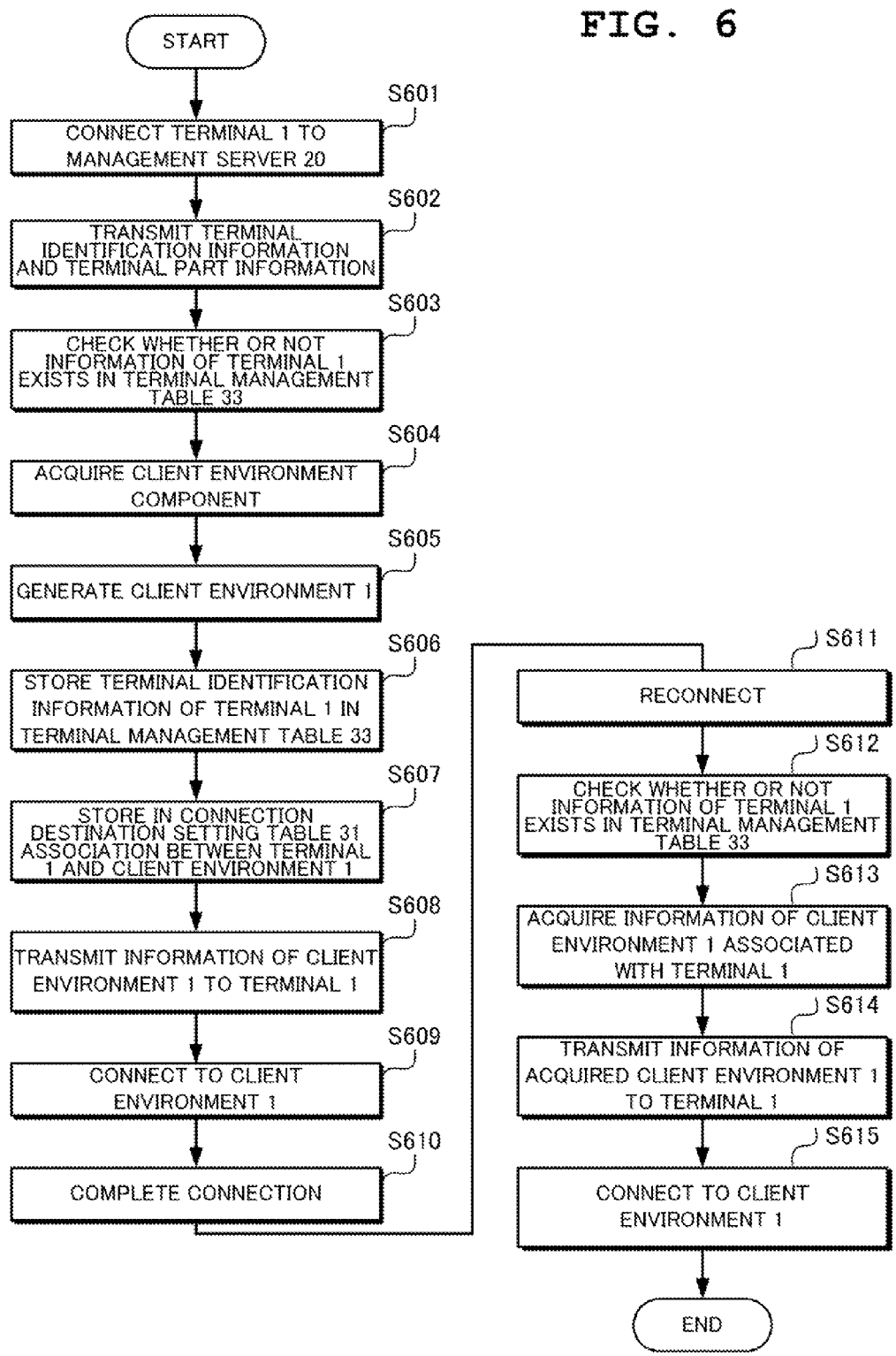
FIG. 6 is a flow chart showing an operation of a thin client system according to a first example of the present invention.

The operation of the present example will be described in detail with reference to the flow chart in FIG. 6. In the present example, a case where a user A uses a terminal 1 (terminal 10-1) will be described by way of example.

By operation of the user A, first; the connection unit 12-1 of the terminal 1 is connected to the management server 20 (step S601). At that time, the connection unit 12-1 transmits the terminal identification information and terminal part information of the terminal 1 to the management server 20 (step S602).

Here, in the example, it is assumed that the terminal 1 has terminal parts 1 to 5 (terminal parts 101-1-1 to 101-1-5).

Then, the session management unit 21 of the management server 20 uses the terminal identification information of the terminal 1 to make a reference to the terminal management table 33, and checks whether or not the information of the terminal 1 exists in the terminal management table 33 (step S603).

Since the terminal management table 33 is empty at that time, the client environment management unit 22 then uses the terminal part information of the terminal 1 to make a reference to the terminal part table 32, and acquires the client environment component corresponding to the terminal part information of the terminal 1 (step S604).

Since the terminal 1 has the terminal parts 1 to 5, the client environment management unit 22 acquires, as the client environment component, hardware information of "CPU 2 GHz", "memory 2.0 GB" and "HDD 40 GB", and software information of "Operating System A" and "Virus Scan Software A".

Then, the client environment management unit 22 generates in the client environment server 40 a client environment 1 (client environment 41-1) according to the acquired client component (step S605).

As a result, the client environment 1 is generated in the client environment server 40, which has hardware information of "CPU 2 GHz" and "memory 2.0 GB, HDD 40 GB", and where, as software, "Operating System A" and "Virus Scan Software A" are installed.

After the client environment 1 is generated, the terminal management unit 23 stores the terminal identification information of the terminal 1 in the terminal management table 33 (step S606).

In addition, the session management unit 21 stores in the connection destination setting table 31 the association between the terminal 1 and the client environment 1 (step S607).

Then, the session management unit 21 transmits the information of the generated client environment 1 to the terminal 1 (step S608).

When the terminal 1 receives the information of the client environment 1 from the management server 20, the connection unit 12 is connected to the client environment 1 based on the information (step S609).

Then, after the establishment of the connection between the terminal 1 and the client environment 1 is completed (step S610), when the connection unit 12-1 of the terminal 1 is connected to the management server 20 by the operation of the user A again (step S611), the session management unit 21 of the management server 20 uses the retransmitted terminal identification information to make a reference to the terminal management table 33, and checks whether or not the information of the terminal 1 exists in the terminal management table 33 (step S612).

Since the terminal identification information of the terminal 1 is stored in the terminal management table 33 at that time, the session management unit 21 then uses the terminal identification information of the terminal 1 to make a reference to the connection destination setting table 31, and acquires the information of the client environment 1 associated with the terminal 1 (step S613).

Then, the session management unit 21 transmits the information of the acquired client environment 1 to the terminal 1 (step S614).

When the terminal 1 receives the information of the client environment 1 from the management server 20, the connection unit 12 is connected to the client environment 1 based on the information (step S615).

Effect of the First Exemplary Embodiment

According to the present exemplary embodiment, the number of man-hours can be reduced.

This is because the administrator does not have to generate the client environment 41-$n$ in advance, and does not have to register information in the terminal management table 33 and connection destination setting table 31.

Second Exemplary Embodiment

Then, a second exemplary embodiment of the present invention will be described in detail with reference to the drawings. In the following drawings, the structure of portions that are not related to the substance of the present invention is omitted and not shown.

In the first exemplary embodiment, as described above, if the terminal 10-$m$ is used, the same client environment 41-$n$ can be used every time. For example, according to the first example described above, after the client environment 1 is created initially, the terminal 1 can use the client environment 1 every time.

However, in this case, there is a problem that when the terminal 10-$m$ is lost or stolen by a third party, illegal access may cause damage.

Figure 7:
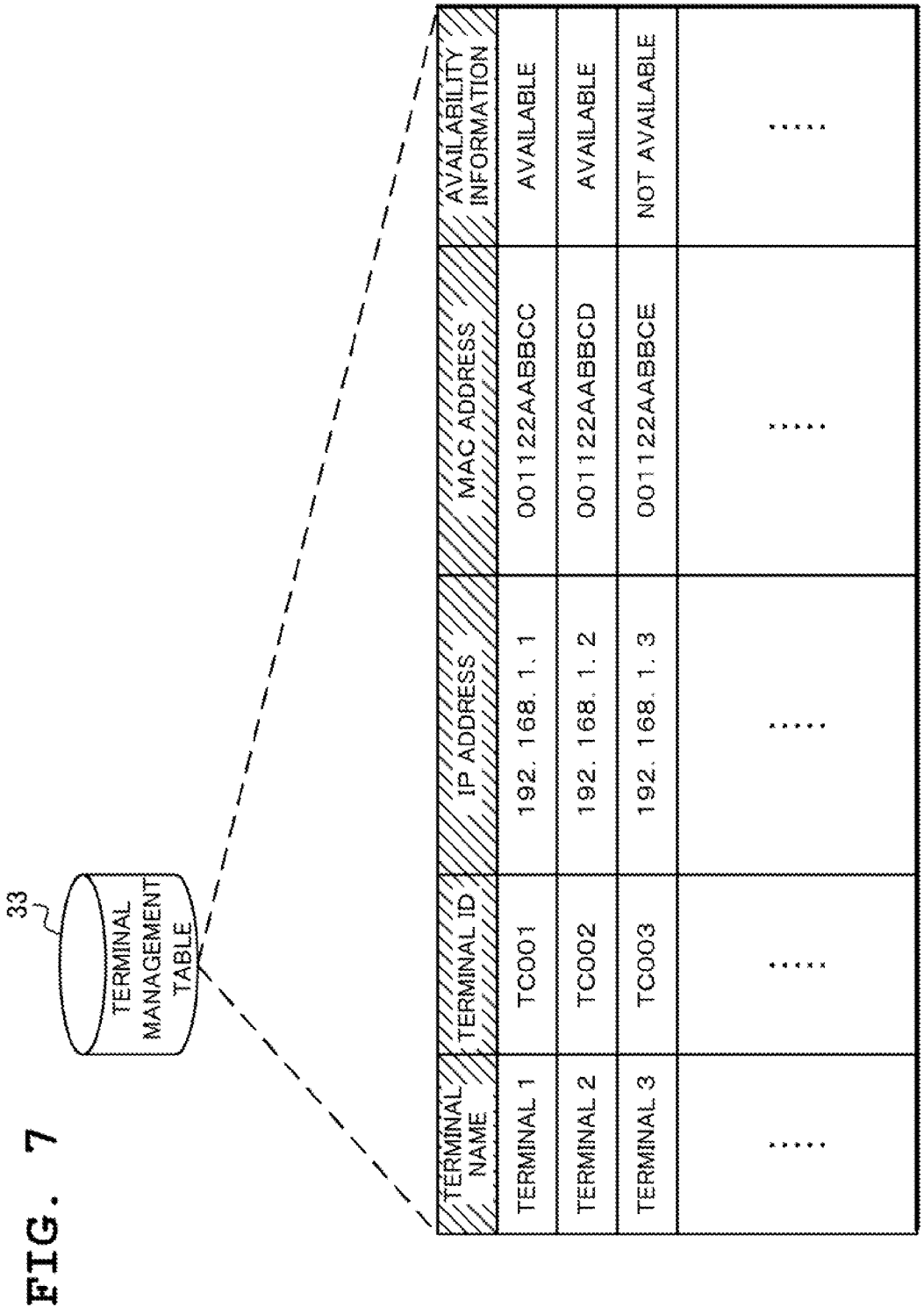
FIG. 7 is a diagram showing an example of the structure of a terminal management table according to a second exemplary embodiment of the present invention.

In the present exemplary embodiment, in order to solve the above problem, the terminal management table 33 further stores availability information of the terminal 10-$m$. An example of the structure of the terminal management table 33 according to the present exemplary embodiment is shown in FIG. 7.

The availability information is information indicating whether or not the terminal 10-$m$ can use this system. By changing the setting of the availability information, it becomes possible to temporarily prevent the terminal 10-$m$ from using the system.

Note that since the structure other than the above is the same as that of the first exemplary embodiment, the detail thereof is omitted.

Description of Operation of the Second Exemplary Embodiment

Next, the operation of the thin client system 100 according to the present exemplary embodiment will be described with reference to the flow chart in FIG. 8.

Figure 8:
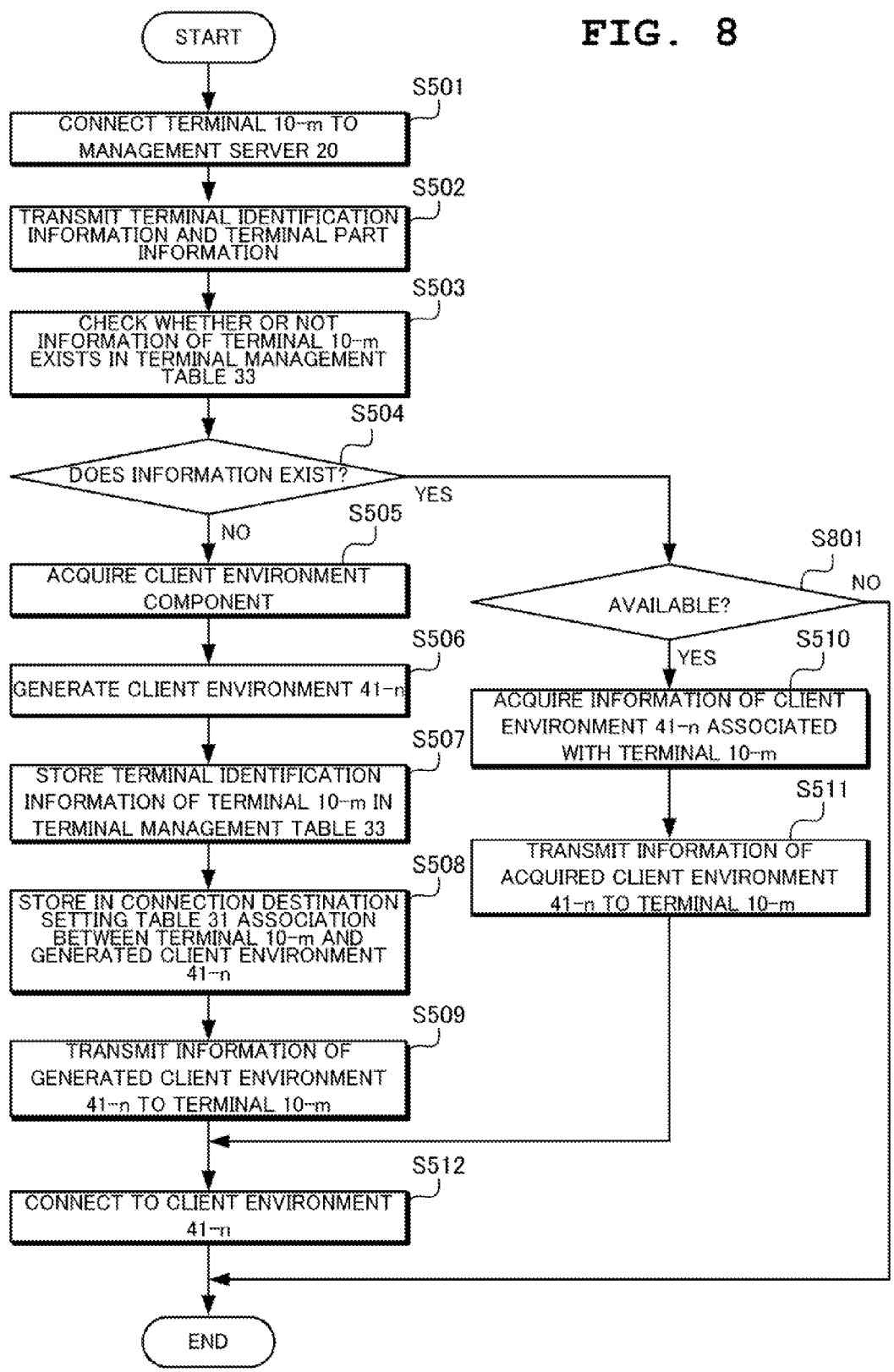
FIG. 8 is a flow chart showing an operation of a thin client system according to the second exemplary embodiment.

FIG. 8 is a flow chart illustrating the operation of the present exemplary embodiment, in addition to the first exemplary embodiment shown in FIG. 5. Therefore, the description of the same portions as those of the first exemplary embodiment will be omitted.

According to the present exemplary embodiment, if the information of the terminal 10-$m$ exists in the terminal management table 33 (step S504, "Yes"), the session management unit 21 makes a reference to the availability information associated with the terminal 10-$m$, and determines whether or not the terminal 10-$m$ has been set to "available" (step S801). The session management unit 21 determines that the terminal 10-$m$ is available when the availability information indicates "available"; on the other hand, determines that the terminal 10-$m$ is not available when the availability information indicates "not available".

When the terminal 10-$m$ has been set to "not available", the session management unit 21 finishes the processing (step S801, "No").

Effect of the Second Exemplary Embodiment

According to the present exemplary embodiment, the risk on security that may occur when the terminal 10-$m$ is stolen or lost can be reduced.

This is because in the case that illegal access from the terminal 10-*m* is expected, when the administrator sets in the terminal management table 33 the availability information of the terminal 10-*m* to "not available", then it becomes possible to prevent the terminal 10-*m* from using the client environment 41-*n*.

Third Exemplary Embodiment

Next, a third exemplary embodiment of the present invention will be described in detail with reference to the drawings. In the following drawings, the structure of portions that are not related to the substance of the present invention is omitted and not shown.

An asset management system that manages physical assets, such as a terminal, almost without exception, exists in a company and the like. In the present exemplary embodiment, the terminal information of the asset management system is used to generate a client environment.

Figure 9:
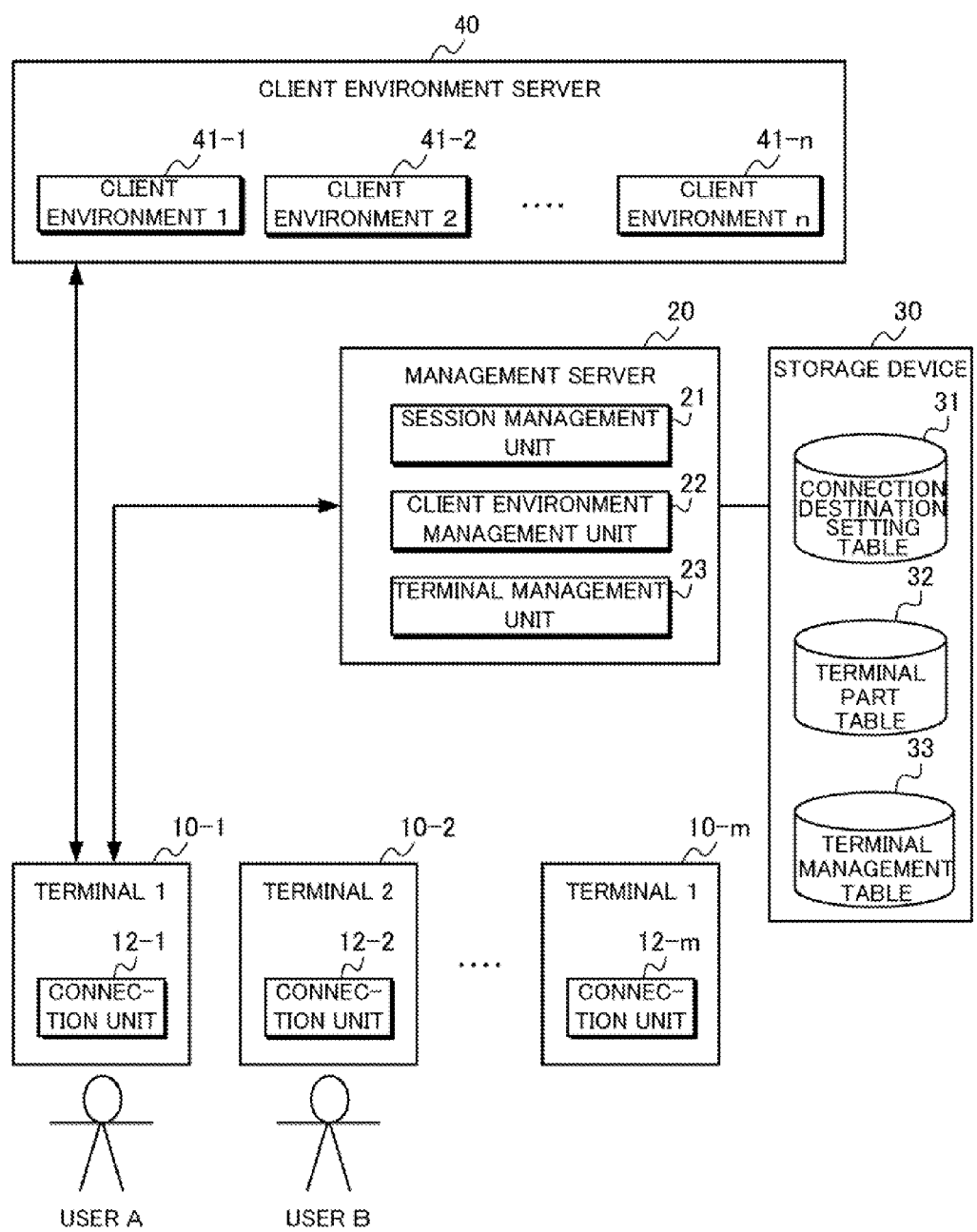
FIG. 9 is a diagram showing an example of the structure of a terminal management table according to a third exemplary embodiment of the present invention.

FIG. 9 is a block diagram showing the structure of a thin client system 100 according to the present exemplary embodiment.

Although in the first exemplary embodiment, the terminal part information is incorporated into the terminal part 11-*m*-*k*, in the present exemplary embodiment, the terminal part information is not incorporated into the terminal 10-*m*, but is registered in the management server 20 in advance as terminal information.

Figure 10:
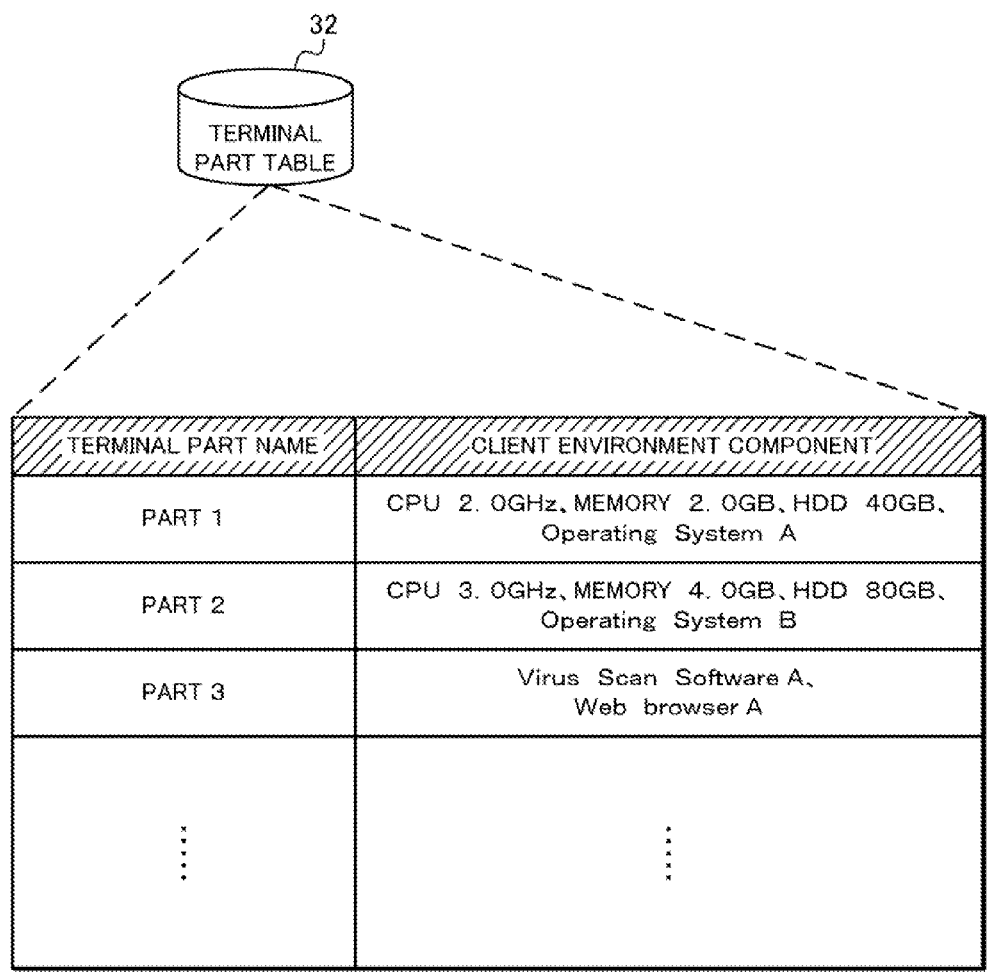
FIG. 10 is a diagram showing an example of the structure of a terminal part table according to the third exemplary embodiment.

An example of the structure of the terminal part table 32 according to the present exemplary embodiment is shown in FIG. 10. Data of the terminal part table 32 are set and registered by the administrator in advance.

Figure 11:
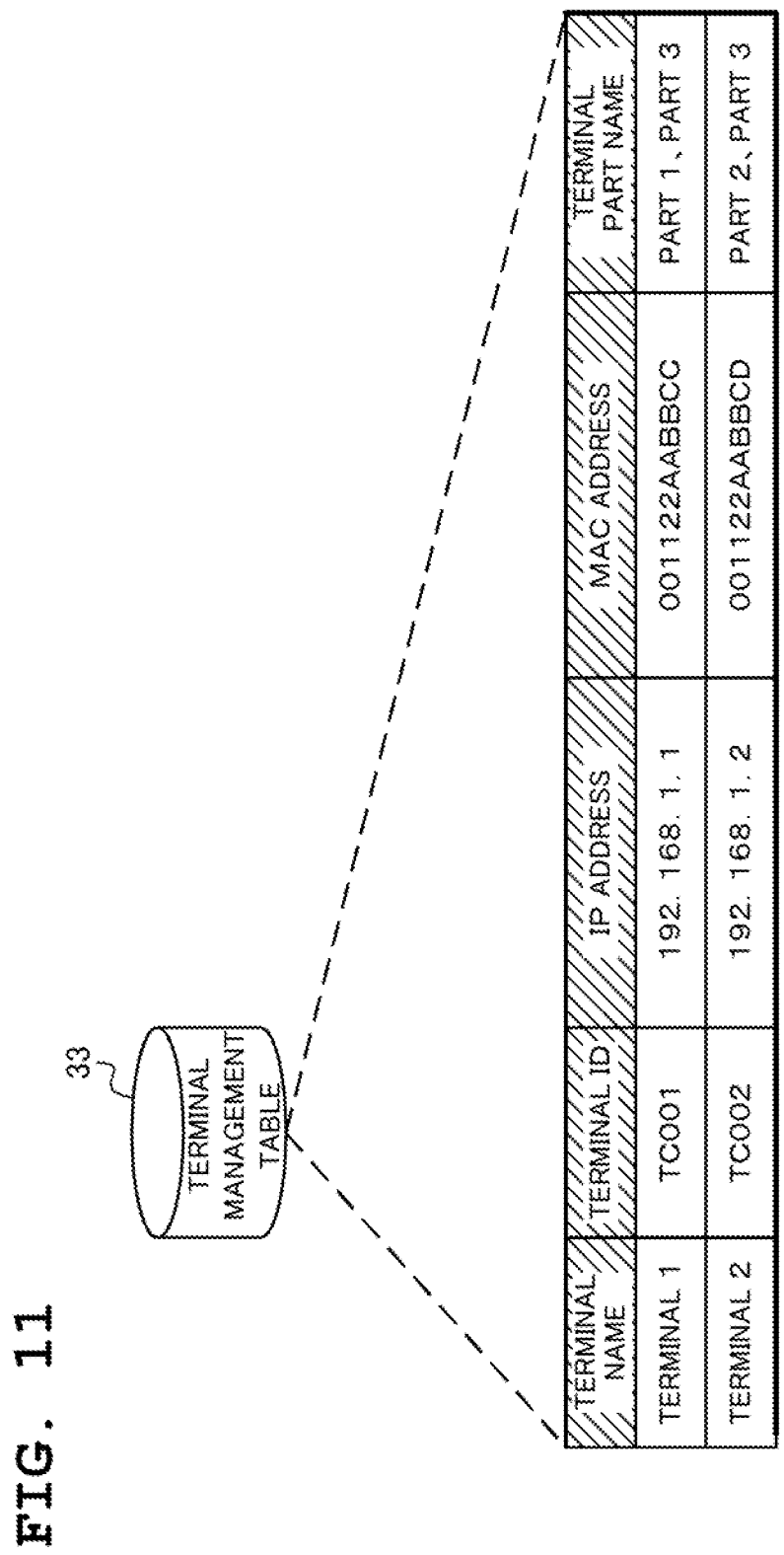
FIG. 11 is a diagram showing an example of the structure of a terminal management table according to the third exemplary embodiment.

In addition, an example of the structure of the terminal management table 33 according to the present exemplary embodiment is shown in FIG. 11. Referring to FIG. 11, the terminal management table 33 further includes terminal part information (terminal part name) compared with that of the first exemplary embodiment.

Data of the asset management system described above is used for data of the terminal management table 33. The data is entered at any timing. The data may be manually entered by the administrator or may be automatically entered by acquiring information from the asset management system.

Since the structure other than the above is the same as that of the first exemplary embodiment, the detail thereof is omitted.

Description of Operation of the Third Exemplary Embodiment

Next, the operation of the thin client system 100 according to the present exemplary embodiment will be described in detail with reference to the flow chart in FIG. 12.

Note that since the processing after the terminal 10-*m* is connected to the management server 20 is the same as step S510 and onward in FIG. 5, the description thereof will be omitted.

Figure 12:
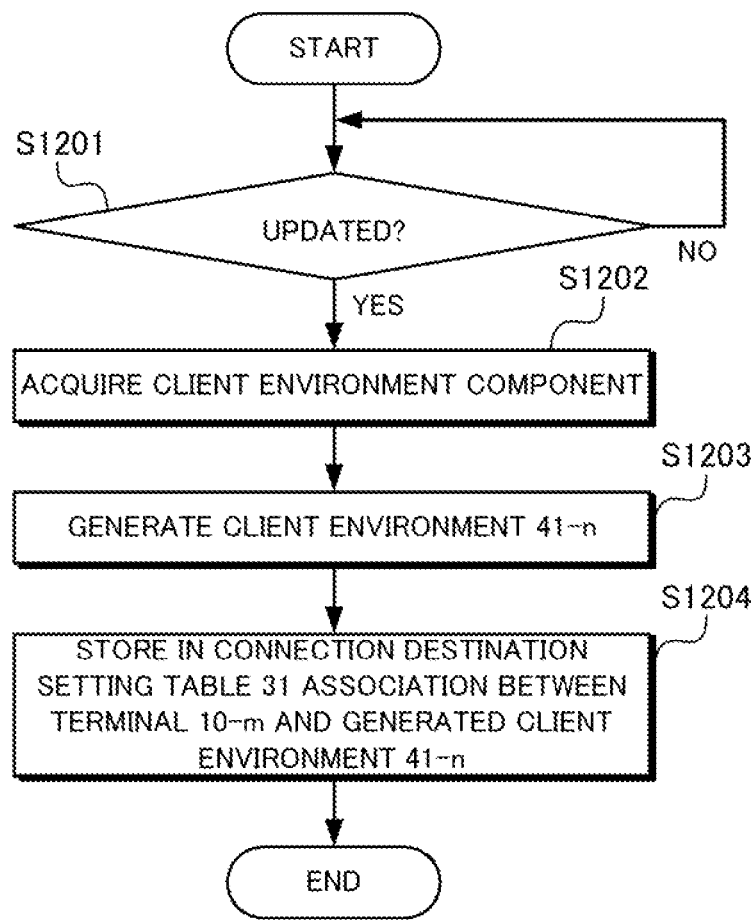
FIG. 12 is a flow chart showing an operation of a thin client system according to the third exemplary embodiment.

Referring to FIG. 12, first, the client environment management unit 22 makes a reference to the terminal management table 33 at regular intervals, and checks whether or not the information in the terminal management table 33 has been updated (including a new entry) (step S1201).

If the administrator enters information and the information in the terminal management table 33 is updated (step S1201, "Yes"), then the client environment management unit 22 uses the terminal part information of the terminal 10-*m* for which the information has been updated to make a reference to the terminal part table 32, and acquires the client environment component corresponding to the terminal part information of the terminal 10-*m* (step S1202).

Then, the client environment management unit 22 generates in the client environment server 40 a client environment 41-*n* according to the acquired client component (step S1203).

After the client environment 41-*n* is generated, the session management unit 21 stores in the connection destination setting table 31 the association between the terminal 10-*m* and the generated client environment 41-*n* (step S1204).

Second Example

Next, the operation of the thin client system 100 according to the present exemplary embodiment will be described with reference to a concrete example.
(Description of Structure)

In the present example, the thin client system 100 has the same structure as that of FIG. 9.

The terminal part table 32 is set in advance as shown in FIG. 10. Although the table structures of the connection destination setting table 31 and the terminal management table 33 are the same as those of FIG. 2 and FIG. 11, the tables contain no data and are empty in the initial condition.

In addition, there is no client environment 41-*n* in the client environment server 40 in the initial condition.
(Description of Operation)

The operation of the present example will be described in detail with reference to the flow chart in FIG. 13.

Figure 13:
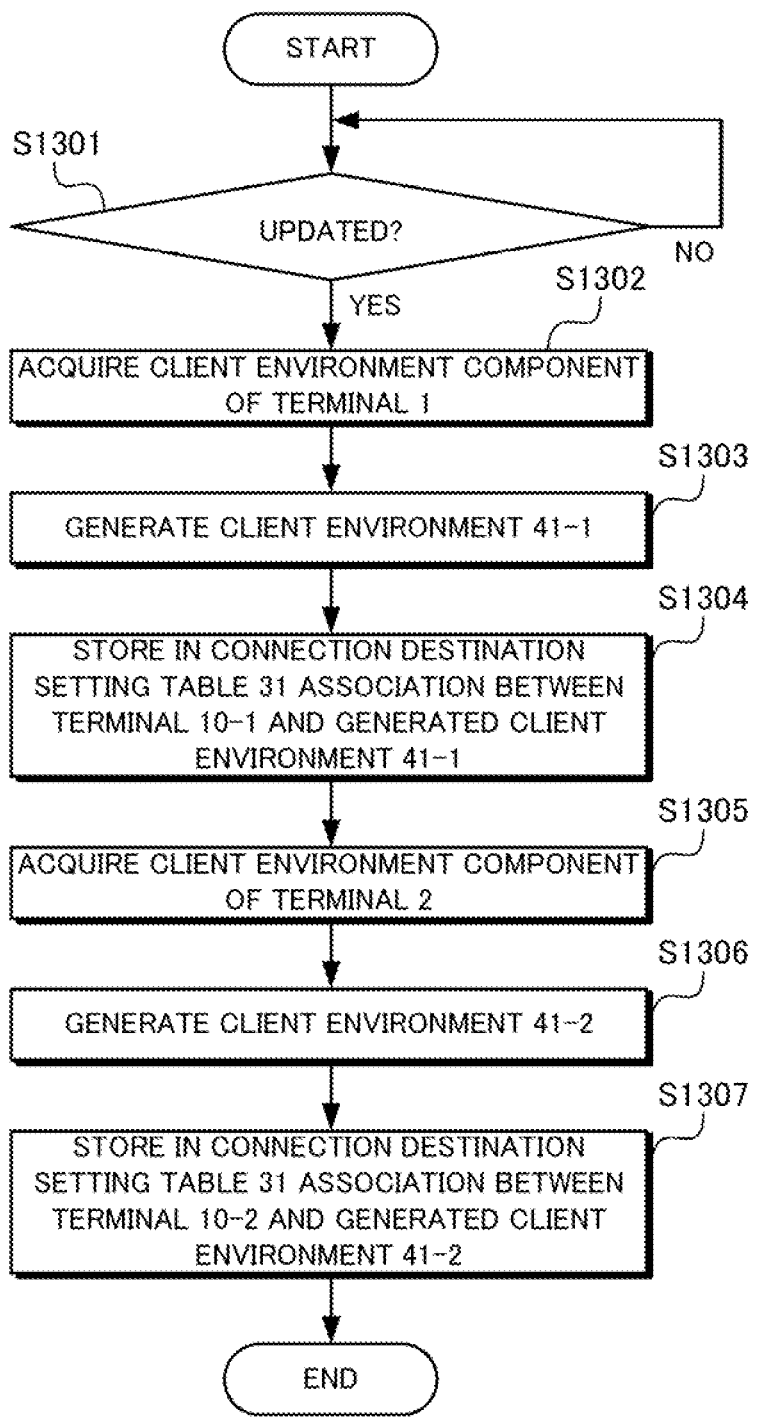
FIG. 13 is a flow chart showing an operation of a thin client system according to a second example of the present invention.

Referring to FIG. 13, first, the client environment management unit 22 makes a reference to the terminal management table 33 at regular intervals, and checks whether or not the information in the terminal management table 33 has been updated (including a new entry) (step S1301).

Here, it is assumed that the information of the terminals 1 and 2 shown in FIG. 11 is entered by the administrator. Then, the client environment management unit 22 checks whether or not there is an update (step S1301, "Yes").

Then, the client environment management unit 22 acquires the client environment component corresponding to the terminal part information of the terminal 1 (part 1, part 3) from the terminal part table 32 (step S1302).

Then, the client environment management unit 22 generates in the client environment server 40 a client environment 41-1 according to the acquired client component (step S1303).

Here, the part 1 and the part 3 represent "CPU 2.0 GHz, memory 2.0 GB, HDD 40 GB, Operating System A" and "Virus Scan Software A, Web browser A", respectively. Therefore, the generated client environment 41-1 has the characteristics of "CPU 2.0 GHz", "memory 2.0 GB", "HDD 40 GB", "Operating System A", "Virus Scan Software A", and "Web browser A".

After the client environment 41-1 is generated, the session management unit 21 stores in the connection destination setting table 31 the association between the terminal 10-1 and the generated client environment 41-1 (step S1304).

Then, the client environment management unit 22 acquires the client environment component corresponding to the terminal part information of the terminal 2 (part 2, part 3) from the terminal part table 32 (step S1305).

Then, the client environment management unit 22 generates in the client environment server 40 a client environment 41-2 according to the acquired client component (step S1306).

Here, the part 2 and the part 3 represent "CPU 3.0 GHz, memory 4.0 GB, HDD 80 GB, Operating System B" and "Virus Scan Software A, Web browser A", respectively. Therefore, the generated client environment 41-2 has the characteristics of "CPU 3.0 GHz", "memory 4.0 GB", "HDD 80 GB", "Operating System B", "Virus Scan Software A", and "Web browser A".

After the client environment 41-2 is generated, the session management unit 21 stores in the connection destination setting table 31 the association between the terminal 10-2 and the generated client environment 41-2 (step S1307).

Figure 14:
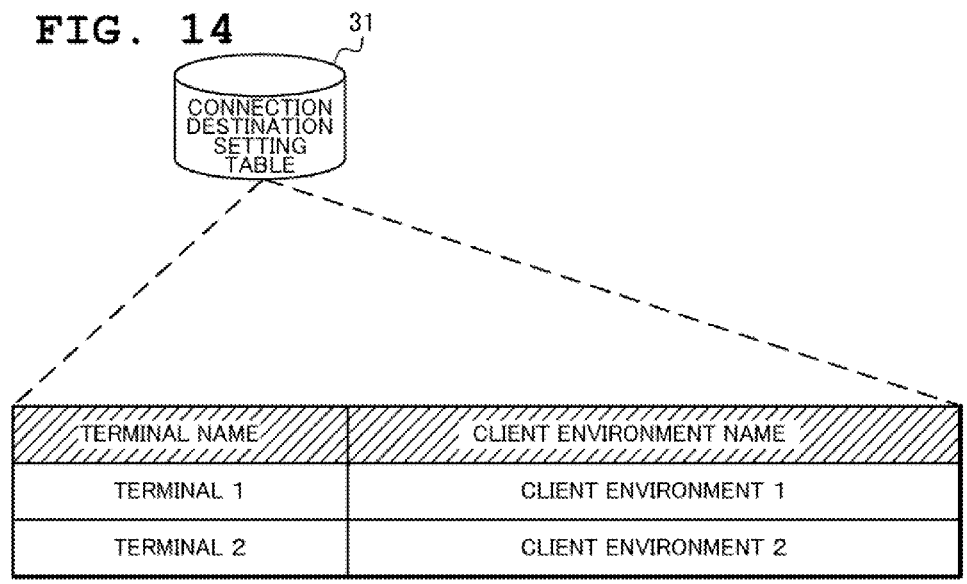
FIG. 14 is a diagram showing an example of the structure of a connection destination setting table according to the second example.

Here, an example of the connection destination setting table 31 from step S1307 and onward is shown in FIG. 14. Note that the processing of the terminal 1 and the processing of terminal 2 may be performed in parallel.

Effect of the Third Exemplary Embodiment

Next, the effect of the present exemplary embodiment will be described.

According to the present exemplary embodiment, a system for managing physical assets such as a terminal which, almost without exception, exists in a company and the like, and the present system can be combined, so that the present system can operate more efficiently.

Figure 15:
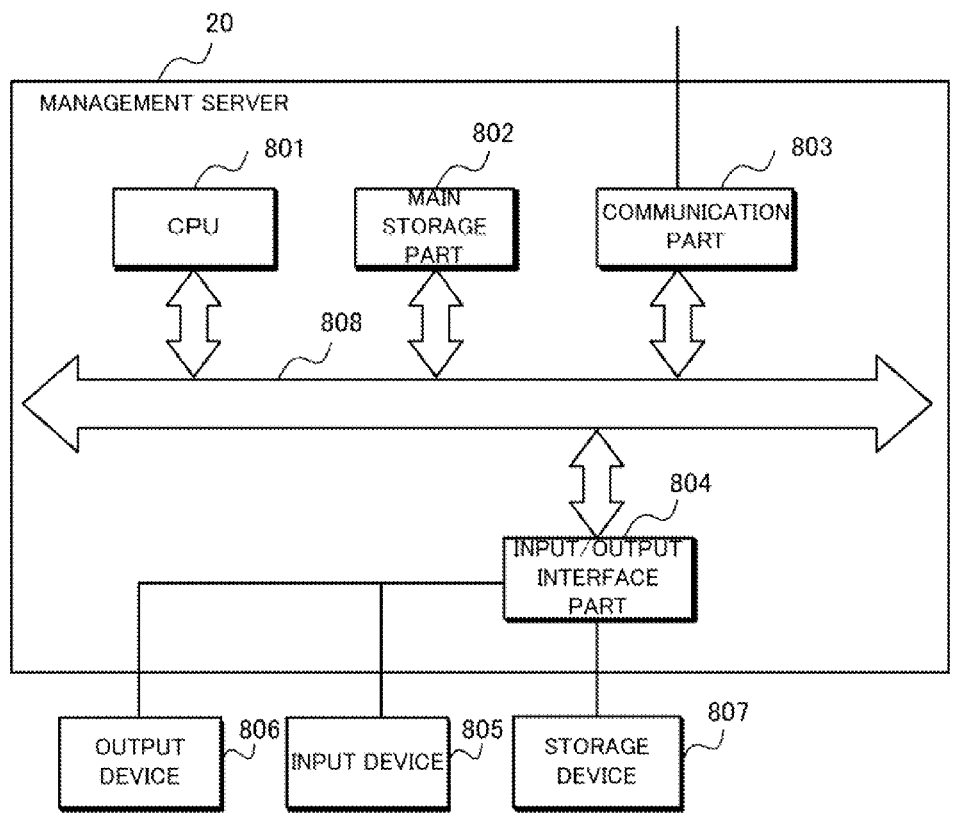
FIG. 15 is a block diagram showing an example of the hardware configuration of a management server according to the present invention.

Next, an example of the hardware configuration of the management server 20 of the present invention will be described with reference to FIG. 15. FIG. 15 is a block diagram showing an example of the hardware configuration of the management server 20.

Referring to FIG. 15, the management server 20 has the same hardware configuration as that of a general computer device, and comprises a CPU (Central Processing Unit) 801, a main storage part 802 constituted by a memory such as a RAM (Random Access Memory) and used for a work space of data or a temporary save area of data, a communication part 803 which transmits and receives data through a network, an input/output interface part 804 which is connected to an input device 805, an output device 806 and a storage device 807 to transmit and receive data, and a system bus 808 which connects each of the components with one another. The storage device 807 is realized by a hard disk device and the like constituted by a nonvolatile memory such as a ROM (Read Only Memory), a magnetic disk and a semiconductor memory.

The session management unit 21, the client environment management unit 22 and the terminal management unit 23 in the management server 20 according to the present invention can achieve their operations obviously in hardware by implementing a circuit terminal component that is a hardware terminal component such as an LSI (Large Scale Integration) in which a program is incorporated, as well as in software by storing a program for providing each function of each component in the storage device 807, loading the program on the main storage part 802 and executing it with the CPU 801.

Note that the terminal 10-$m$ and the client environment server 40 also have such the hardware configuration described above, and achieve each function which each of the terminal 10-$m$ and the client environment server 40 has in hardware manner or in software manner.

Although the present invention has been described in connection with preferred exemplary embodiments, the present invention is not necessarily limited to the present exemplary embodiments described above, and various modifications may be made without departing from the technical idea.

Note that any combination of the above components and representation of the present invention converted among a method, a device, a system, a storage medium, a computer program or the like, are also valid as an aspect of the present invention.

In addition, each component of the present invention does not need to exist independently, and a plurality of components may be formed as one member, one component may be formed by a plurality of members, a component may be part of another component, a portion of a component may be overlapped with a portion of another component, etc.

In addition, although in the method and the computer program of the present invention, a plurality of procedures are described in succession, the order of the description does not limit the order of the execution of the plurality of procedures. Therefore, when the method and the computer program of the present invention are executed, the order of the plurality of procedures can be changed within a range that is not hindering content wise.

Further, the plurality of procedures of the method and the computer program of the present invention are not limited to being executed at a timing that differs individually. Therefore, during the execution of a procedure, another procedure may occur, the execution timing of a procedure and the execution timing of another procedure may be overlapped in whole or in part, etc.

Moreover, although a portion or the whole of the embodiments may also be described similarly to the following claims, there is no limitation thereto.

The whole or part of the exemplary embodiments disclosed above can be described as, but not limited to, the following supplementary notes.

(Supplementary note 1) A thin client system, comprising:

at least one terminal;

a client environment server where a client environment used by the terminal operates; and a management server which allocates the predetermined client environment based on a utilization request of the client environment from the terminal, wherein the management server comprises a client environment management unit which receives from the terminal, terminal identification information for identifying the terminal, and terminal part information for identifying a terminal part which is a component of the terminal, and uses a client environment component that is set in advance so as to correspond to the terminal part information to generate the client environment in the client environment server.

(Supplementary note 2) The thin client system according to supplementary note 1, wherein the terminal part is a hardware element.

(Supplementary note 3) The thin client system according to supplementary note 1, wherein the terminal part is a software element.

(Supplementary note 4) The thin client system according to supplementary notes 1 to 3, comprising a storage device which includes:

a terminal management table which stores the terminal identification information;

a terminal part table which stores an association between the terminal part information and the client environment component; and a connection destination setting table which stores an association between the terminal and the client environment used by the terminal.

(Supplementary note 5) The thin client system according to supplementary note 4, further comprising:

a session management unit which allocates the predetermined client environment to the terminal based on the connection destination setting table; and a terminal management unit which stores the terminal identification information received from the terminal in the terminal management table in a given case, wherein the session management unit checks whether or not the terminal identification information received from the terminal exists in the terminal management table, and when the session management unit determines that the terminal identification information does not exist in the terminal management table, the client environment management unit acquires the client environment component corresponding to the terminal part information from the terminal part table, and generates the client environment in the client environment server with the client environment component as a configuration requirement, the session management unit stores an association between the terminal and the generated client environment in the connection destination setting table, and the terminal management unit stores the terminal identification information in the terminal management table.

(Supplementary note 6) The thin client system according to supplementary note 5, wherein the terminal management table further stores availability information indicating availability information of the terminal, and the session management unit does not allocate the client environment to the terminal when the availability information of the connecting terminal has been set to "not available".

(Supplementary note 7) The thin client system according to any one of supplementary notes 4 to 6, wherein when terminal identification information of the predetermined terminal is removed from the terminal management table, the client environment management unit removes the client environment used by the terminal from the client environment server, and removes an association between the terminal and the client environment from the connection destination setting table.

(Supplementary note 8) A management server of a thin client system which comprises at least one terminal; a client environment server where a client environment used by the terminal operates; and a management server which allocates the predetermined client environment based on a utilization request of the client environment from the terminal, comprising:

a client environment management unit which receives from the terminal, terminal identification information for identifying the terminal, and terminal part information for identifying a terminal part which is a component of the terminal, and uses a client environment component that is set in advance so as to correspond to the terminal part information to generate the client environment in the client environment server.

(Supplementary note 9) The management server according to supplementary note 8, further comprising:

a session management unit which allocates the predetermined client environment to the terminal based on the connection destination setting table which stores an association between the terminal and the client environment used by the terminal; and a terminal management unit which stores the terminal identification information received from the terminal in the terminal management table which stores the terminal identification information in a given case, wherein the session management unit checks whether or not the terminal identification information received from the terminal exists in the terminal management table, and when the session management unit determines that the terminal identification information does not exist in the terminal management table, the client environment management unit acquires the client environment component corresponding to the terminal part information from the terminal part table which stores an association between the terminal part information and the client environment component, and generates the client environment in the client environment server with the client environment component as a configuration requirement, the session management unit stores an association between the terminal and the generated client environment in the connection destination setting table, and the terminal management unit stores the terminal identification information in the terminal management table.

(Supplementary note 10) The management server according to supplementary note 9, wherein the session management unit does not allocate the client environment to the terminal when availability information indicating availability information of the connecting terminal has been set to "not available".

(Supplementary note 11) The management server according to supplementary note 9 or supplementary note 10, wherein when terminal identification information of the predetermined terminal is removed from the terminal management table, the client environment management unit removes the client environment used by the terminal from the client environment server, and removes an association between the terminal and the client environment from the connection destination setting table.

(Supplementary note 12) A client environment management method of a thin client system which comprises at least one terminal; a client environment server where a client environment used by the terminal operates; and a management server which allocates the predetermined client environment based on a utilization request of the client environment from the terminal, wherein the management server receives from the terminal, terminal identification information for identifying the terminal, and terminal part information for identifying a terminal part which is a component of the terminal, and uses a client environment component that is set in advance so as to correspond to the terminal part information to generate the client environment in the client environment server.

(Supplementary note 13) The client environment management method according to supplementary note 12, further comprising:

allocating the predetermined client environment to the terminal based on the connection destination setting table which stores an association between the terminal and the client environment used by the terminal, storing the terminal identification information received from the terminal in the terminal management table which stores the terminal identification information in a given case, checking whether or not the terminal identification information received from the terminal exists in the terminal management table, when it is determined that the terminal identification information does not exist in the terminal management table, acquiring the client environment component corresponding to the terminal part information from the terminal part table which stores an association between the terminal part information and the client environment component, generating the client environment in the client environment server with the client environment component as a configuration requirement, storing an association between the terminal and the generated client environment in the connection destination setting table, and storing the terminal identification information in the terminal management table.

(Supplementary note 14) The client environment management method according to supplementary note 13, wherein the client environment is not allocated to the terminal when availability information indicating availability information of the connecting terminal has been set to "not available".

(Supplementary note 15) The client environment management method according to supplementary note 13 or supplementary note 14, wherein when terminal identification information of the predetermined terminal is removed from the terminal management table, the client environment used by the terminal is removed from the client environment server, and an association between the terminal and the client environment is removed from the connection destination setting table.

(Supplementary note 16) A computer readable medium storing a program executed on management server of a thin client system which comprises at least one terminal; a client environment server where a client environment used by the terminal operates; and the management server which allocates the predetermined client environment based on a utilization request of the client environment from the terminal, wherein the program causes the management server to execute processing of receiving from the terminal, terminal identification information for identifying the terminal, and terminal part information for identifying a terminal part which is a component of the terminal, and using a client environment component that is set in advance so as to correspond to the terminal part information to generate the client environment in the client environment server.

(Supplementary note 17) The computer readable medium according to supplementary note 16, wherein the program causes the management server to execute processing of allocating the predetermined client environment to the terminal based on the connection destination setting table which stores an association between the terminal and the client environment used by the terminal, storing the terminal identification information received from the terminal in the terminal management table which stores the terminal identification information in a given case, checking whether or not the terminal identification information received from the terminal exists in the terminal management table, when it is determined that the terminal identification information does not exist in the terminal management table, acquiring the client environment component corresponding to the terminal part information from the terminal part table which stores an association between the terminal part information and the client environment component, generating the client environment in the client environment server with the client environment component as a configuration requirement, storing an association between the terminal and the generated client environment in the connection destination setting table, and storing the terminal identification information in the terminal management table.

(Supplementary note 18) The computer readable medium according to supplementary note 17, wherein the program causes the management server to execute processing of stopping allocating the client environment to the terminal when availability information indicating availability information of the connecting terminal has been set to "not available".

(Supplementary note 19) The computer readable medium according to supplementary note 17 or supplementary note 18, wherein the program causes the management server to execute processing of when terminal identification information of the predetermined terminal is removed from the terminal management table, removing the client environment used by the terminal from the client environment server, and removing an association between the terminal and the client environment from the connection destination setting table.

What is claimed is:

1. A client environment management method of a thin client system which comprises at least one terminal; a client environment server where a predetermined client environment used by said terminal operates; and a management server which allocates said predetermined client environment based on a utilization request of said predetermined client environment from said terminal, wherein said management server receives from said terminal, terminal identification information for identifying the terminal and terminal part information for identifying a terminal part which is a hardware element and a software element in a component of the terminal, and generates said predetermined client environment in said client environment server by using a client environment component that is set in advance so as to correspond to said terminal part information, wherein said hardware element includes a CPU (Central Processing Unit) and a memory, and said software element includes an OS (Operating System) and an application.

2. A non-transitory computer readable medium storing a program executed on a management server of a thin client system which comprises at least one terminal; a client environment server where a predetermined client environment used by said terminal operates; and said management server which allocates said predetermined client environment based on a utilization request of the client environment from said terminal, wherein said program causes said management server to execute processing of receiving from said terminal, terminal identification information for identifying the terminal and terminal part information for identifying a terminal part which is a hardware element and a software element of a component of the terminal, and generating said predetermined client environment in said client environment server by using a client environment component that is set in advance so as to correspond to said terminal part information, wherein said hardware element includes a CPU (Central Processing Unit) and a memory, and said software element includes an OS (Operating System) and an application.

3. A thin client system, comprising:

at least one terminal;

a client environment server where a predetermined client environment used by said terminal operates; and a management server which allocates said predetermined client environment based on a utilization request of the client environment from said terminal, wherein said management server comprising:

a processor; and a memory;

wherein said processor executes a client environment management unit configured to receive from said terminal, terminal identification information for identifying the terminal and terminal part information for identifying a terminal part which is a hardware element and a software element in a component of the terminal, and to generate said predetermined client environment in said client environment server by using a client environment component that is set in advance so as to correspond to said terminal part information, wherein said hardware element includes a CPU (Central Processing Unit) and a memory, and said software element includes an OS (Operating System) and an application.

4. The thin client system according to claim 3, comprising a storage device which includes:

a terminal management table which stores said terminal identification information;

a terminal part table which stores an association between said terminal part information and said client environment component; and a connection destination setting table which stores an association between said terminal and said client environment used by the terminal.

5. The thin client system according to claim 4, where said processor executes a session management unit configured to allocate said predetermined client environment to said terminal based on said connection destination setting table; and a terminal management unit configured to store said terminal identification information received from said terminal in said terminal management table in a given case, wherein said session management unit checks whether or not said terminal identification information received from said terminal exists in said terminal management table, and when said session management unit determines that said terminal identification information does not exist in said terminal management table, said client environment management unit acquires said client environment component corresponding to said terminal part information from said terminal part table, and generates said client environment in said client environment server with the client environment component as a configuration requirement, said session management unit stores an association between said terminal and said generated client environment in said connection destination setting table, and said terminal management unit stores said terminal identification information in said terminal management table.

6. The thin client system according to claim 5, wherein said terminal management table further stores availability information indicating availability information of said terminal, and said session management unit does not allocate said client environment to the terminal when the availability information of said connecting terminal has been set to "not available".

7. The thin client system according to claim 4, wherein when terminal identification information of said predetermined terminal is removed from said terminal management table, said client environment management unit removes said client environment used by the terminal from said client environment server, and removes an association between the terminal and the client environment from said connection destination setting table.

8. A management server of a thin client system which comprises at least one terminal; a client environment server where a predetermined client environment used by said terminal operates; and a management server which allocates said predetermined client environment based on a utilization request of the predetermined client environment from said terminal, comprising:

a processor; and a memory;

wherein said processor executes a client environment management unit configured to receive from said terminal, terminal identification information for identifying the terminal and terminal part information for identifying a terminal part which is a hardware element and a software element in a component of the terminal, and to generate said predetermined client environment in said client environment server by using a client environment component that is set in advance so as to correspond to said terminal part information, wherein said hardware element includes a CPU (Central Processing Unit) and a memory, and said software element includes an OS (Operating System) and an application.

* * * * *